US012707012B2

(12) United States Patent
Caseau

(10) Patent No.: US 12,707,012 B2
(45) Date of Patent: Aug. 11, 2026

(54) ROUTING A TELEPHONE CALL TO AN ALIAS VOICEMAIL SYSTEM

(71) Applicant: Orange, Issy-les-Moulineaux (FR)

(72) Inventor: François Caseau, Chatillon Cedex (FR)

(73) Assignee: Orange, Issy-les-Moulineaux (FR)

( * ) Notice: Subject to any disclaimer, the term of this patent is extended or adjusted under 35 U.S.C. 154(b) by 666 days.

(21) Appl. No.: 18/002,582

(22) PCT Filed: Jun. 23, 2021

(86) PCT No.: PCT/FR2021/051156
§ 371 (c)(1),
(2) Date: Dec. 20, 2022

(87) PCT Pub. No.: WO2021/260330
PCT Pub. Date: Dec. 30, 2021

(65) Prior Publication Data

US 2023/0239405 A1 Jul. 27, 2023

(30) Foreign Application Priority Data

Jun. 24, 2020 (FR) .................................... 2006595

(51) Int. Cl.
*H04M 3/533* (2006.01)

(52) U.S. Cl.
CPC .................................. *H04M 3/533* (2013.01)

(58) Field of Classification Search
CPC .................................................... H04M 3/533
See application file for complete search history.

(56) References Cited

U.S. PATENT DOCUMENTS 8,693,655 B1 * 4/2014 Chau .................... H04M 17/10 379/201.11
2015/0181025 A1 * 6/2015 McBride .......... H04M 3/42008 455/414.1

FOREIGN PATENT DOCUMENTS

FR 3046002 A1 6/2017
FR 3046009 A1 6/2017
FR 3079702 A1 10/2019

OTHER PUBLICATIONS

International Search Report for International Application No. PCT/FR2021/051156, dated Sep. 15, 2021.

* cited by examiner

*Primary Examiner* — Amal S Zenati
(74) *Attorney, Agent, or Firm* — Knobbe, Martens, Olson & Bear, LLP

(57) ABSTRACT

A method for establishing a telephone communication between a first terminal and a second terminal. The first and second terminals each have a main caller identifier, and the second terminal additionally has a secondary caller identifier. This method is implemented when the user of the first terminal seeks to communicate with the user of the second terminal by using the secondary caller identifier of the second terminal. The method allows redirecting the telephone call of the first terminal to a voicemail system associated with the secondary caller identifier when the user of the second terminal does not answer this telephone call. The voicemail system is associated with a voicemail system caller identifier selected from a database connected to a communication management platform.

14 Claims, 3 Drawing Sheets

ROUTING A TELEPHONE CALL TO AN ALIAS VOICEMAIL SYSTEM

CROSS-REFERENCE TO RELATED APPLICATIONS

This application is filed under 35 U.S.C. § 371 as the U.S. National Phase of Application No. PCT/FR2021/051156 entitled "ROUTING A TELEPHONE CALL TO AN ALIAS VOICEMAIL SYSTEM" and filed Jun. 23, 2021, and which claims priority to FR 2006595 filed Jun. 24, 2020, each of which is incorporated by reference in its entirety.

BACKGROUND

Field

The field of the development relates to the routing of a telephone call to a voicemail system, and in particular to an alias voicemail system.

Description of the Related Technology

A mobile communication terminal generally has a main caller identifier enabling anyone to establish a telephone communication with the user of the mobile communication terminal in question, provided of course that they know the main caller identifier. Typically, the main caller identifier is an MSISDN identifier (acronym for "Mobile Station International Subscriber Directory Number") uniquely corresponding to the SIM card (acronym for "Subscriber Identity Module") provided by the operator of the mobile network to which the user of the mobile communication terminal has subscribed. As a general rule, this main caller identifier is the mobile terminal's telephone number in the mobile network.

In addition, communication services guaranteeing the anonymity of a user propose allocating a secondary caller identifier to the terminal of a user who already has a main caller identifier. These communication services are, for example, offered to companies or businesses wishing to benefit from alias services. Thus, when an employee of a company calls customers via an alias service, it is a secondary caller identifier, also called an alias number, which is presented to his or her customers, and not his or her main caller identifier. In other words, an alias technology makes it possible to associate one or more "virtual" telephone numbers with the "real" telephone number which actually carries the communication.

When a customer calls an alias number, for example of a company, the real telephone number of the employee with which the alias number is associated is not disclosed. Such a telephone call is first redirected to a communication management platform, more commonly known as an alias platform, which, as it knows the real telephone number associated with the alias telephone number, sends the telephone call to the real telephone number.

However, if the employee in question does not answer the customer's telephone call, for example if he or she is absent or does not wish to answer, the customer's call goes to the voicemail system of the real telephone number which can lead to anonymity issues. Indeed, the voicemail system of the real telephone number may provide information concerning the identity of the employee who was called, for example the last name or first name. In addition, the employee may also wish not to overload the voicemail system for his or her real telephone number and may prefer that this type of call, meaning calls to the alias number, be redirected to a voicemail system specific to the alias number.

It may also occur that the same secondary caller identifier is shared between several main caller identifiers. In other words, the same alias number may be shared between several users having different real telephone numbers. This case arises in particular in the case of a company benefiting from a limited number of alias numbers used by the various employees to contact a customer.

SUMMARY

The present development improves the situation.

In this respect, the present development relates to a method for establishing a telephone communication from a first communication terminal to a second communication terminal, the first and second communication terminals each having a main caller identifier, the second communication terminal further having a secondary caller identifier. The method comprises:

- receiving from the first terminal, at a communication management platform, a first request for telephone communication, comprising the secondary caller identifier of said second terminal,
- sending to the second terminal, by the communication management platform, a second request for telephone communication, the second request comprising the main caller identifier of the second terminal.

The method further comprises:

- in the event of the communication management platform not receiving, from the second terminal, a favorable response to the second request:
  - sending to a voicemail system platform, via a data channel, a voicemail system caller identifier associated with said secondary caller identifier,
  - sending to the voicemail system platform a request for telephone communication aiming to establish a communication between the first terminal and a voicemail system with which the voicemail system caller identifier is associated.

The development preserves the anonymity of the user of the second terminal. Indeed, when the user of the second terminal does not answer the call from the user of the first terminal, the method in question provides for redirecting the communication to a voicemail system associated with the secondary caller identifier. Thus, the voicemail system selected at the communication management platform is not the one associated with the main number, i.e. the main caller identifier, but with a voicemail system associated with the alias number, therefore the secondary caller identifier. It is thus possible to take advantage of the fact that the user of the second terminal has subscribed to one or more anonymization services, also called alias services, in order to make use of a voicemail system associated with an alias number.

In the event of the communication management platform not receiving, from the second terminal, a favorable response to the second request for telephone communication, the voicemail system platform receives, via different channels, a voicemail system caller identifier associated with the secondary caller identifier, and a request for telephone communication aiming to establish a communication between the first terminal and a voicemail system with which the voicemail system caller identifier is associated.

It should be noted that the voicemail system caller identifier associated with the secondary caller identifier is sent by the communication management platform to the voicemail system platform via a channel that is different from the channel for sending the request for telephone communication aiming to establish a communication between the first terminal and a voicemail system.

The development is typically implemented when the user of the second terminal is an employee of a company, a business, or civil service, and the user of the first terminal is a customer wishing to solve a problem or ask for information. The customer does not have the employee's real number, which is a private number, but does have an alias number.

According to one feature, the request for telephone communication aiming to establish a communication between the first terminal and said voicemail system comprises the secondary caller identifier and/or the main caller identifier of the second terminal, one among said identifiers being used to correlate said voicemail system caller identifier and said request for telephone communication aiming to establish a communication between the first terminal and said voicemail system.

The voicemail system platform thus makes the link between the voicemail system caller identifier received and the request for telephone communication, and transfers this request to the voicemail system corresponding to the caller identifier received.

According to a first embodiment, the method further comprises:

sending to the voicemail system, by the communication management platform, in parallel with or subsequent to the sending of the second request to the second terminal, a third request for telephone communication, the third request comprising the voicemail system caller identifier of the voicemail system, the sending of the third request opening the third communication channel, the method further comprising, in the event of the communication management platform receiving, from the second terminal, a favorable response to the second request:

closing the third communication channel.

This first embodiment therefore aims to anticipate an unfavorable response from the user of the second terminal or no reception of a favorable response, at the communication management platform. The third request is thus sent to the voicemail system at the same time as the second request is sent to the second terminal. This sending in advance allows the user of the first terminal to be quickly placed in telephone communication with the voicemail system of the alias number when the user of the second terminal does not answer the call.

Alternatively, according to a second embodiment, the method further comprises, in the absence of the communication management platform receiving from the second terminal a favorable response to the second request:

sending to the voicemail system, by the communication management platform, a third request for telephone communication, the third request comprising the voicemail system caller identifier of the voicemail system, the sending of the third request opening the third communication channel.

This second embodiment prevents sending the third request unnecessarily to the voicemail system associated with the alias number.

The sending of the third request to the voicemail system is implemented for example via an application programming interface of a voicemail system platform. The voicemail system platform extracts the voicemail system caller identifier included in the third request, and routes the third request to the voicemail system. As indicated above, the voicemail system caller identifier is routed to a voicemail system platform via a data channel.

Typically, the sending of the third request to the voicemail system means sending a first sub-request and a second sub-request. The first sub-request corresponds to a voice call, to record a voice message on the voicemail system. The second sub-request corresponds to a call to the application programming interface. The first and second sub-requests are correlated at the voicemail system platform or at the voicemail system.

Thus, the third request sent by the communication management platform to the voicemail system corresponds to two separate requests. The first of these requests is in fact a conventional telephony request: a voice call. This request contains the main caller identifier of the second terminal and carries the communication between the first terminal and the voicemail system. This first request therefore allows the user of the first terminal to leave a voice message. The second of these requests is an API call. This request contains the main caller identifier or the secondary caller identifier of the second terminal, and the voicemail system caller identifier. The correlation between these two requests, which therefore constitute the third request for telephone communication within the meaning of the development, is carried out at the voicemail system or at the voicemail system platform so that the user of the first terminal can record his or her voice message in the voicemail system selected for this purpose.

Typically, the voicemail system caller identifier is selected in a database stored on or connected to the communication management platform.

In one or more embodiments, the first request is routed to the communication management platform via an interactive voice response server, the communication management platform thus receiving, in addition to the first request, input data characterizing a service requested by a user of the first terminal. In this case, the obtained voicemail system caller identifier is selected on the basis of said service. The secondary caller identifier, the requested service, and the voicemail system caller identifier are associated within the database.

The input data are generated for example via one or more interactions by the user with a telephone dialer type of application on the first terminal and/or via spoken information provided by the user of the first terminal.

Thus, in this embodiment, the database is organized as follows: at least one secondary caller identifier is stored in the database in association with a service and a voicemail system caller identifier. The communication management platform thus extracts the secondary caller identifier from the first request as well as the service corresponding to the input data provided by the user of the first terminal via the interactive voice response server. The combination of the secondary caller identifier entered by the user of the first terminal and the identified service allows selecting the appropriate voicemail system caller identifier, and therefore the appropriate corresponding voicemail system.

Furthermore, a same secondary caller identifier may be shared by several main caller identifiers. In such case, advantageously, the pair formed by a secondary caller identifier and a given service may be associated not only with a voicemail system caller identifier but also with a main caller identifier of a called terminal (for example the second terminal), this being one of the real numbers associated with the virtual number that constitutes the secondary caller identifier. Thus, using the secondary caller identifier dialed by the user of the first terminal and the service requested by this user, the communication management platform can also, if this secondary caller identifier is shared by several main caller identifiers, search the database for the main caller identifier, here the main caller identifier of the second terminal, associated with the pair formed by the secondary caller identifier and the service requested.

Concurrently or alternatively, the obtained voicemail system caller identifier is selected on the basis of the main caller identifier of the first terminal. The secondary caller identifier, the main identifier of the first terminal, and the voicemail system caller identifier are associated within the database.

In this embodiment, the database is organized as follows: at least one secondary caller identifier is stored in the database, this time in association with a calling main caller identifier, for example here the main caller identifier of the first terminal, and a voicemail system caller identifier. The communication management platform thus extracts the secondary caller identifier from the first request as well as the main caller identifier of the terminal issuing the request, therefore the calling terminal. The combination of the secondary caller identifier dialed by the user of the first terminal and the main caller identifier of the calling terminal allows selecting the appropriate voicemail system caller identifier, and therefore the appropriate corresponding voicemail system.

Moreover, when a same secondary caller identifier is shared by several main caller identifiers, the pair formed by a secondary caller identifier and a main caller identifier of a calling terminal may advantageously be associated not only with a voicemail system caller identifier but also with a main caller identifier of a called terminal (for example the second terminal), this being one of the real numbers associated with the virtual number that constitutes the secondary caller identifier. Thus, using the secondary caller identifier dialed by the user of the first terminal and the main caller identifier of the terminal of this user, the communication management platform can also, if this secondary caller identifier is shared by several main caller identifiers, search the database for the main caller identifier, here the main caller identifier of the second terminal, associated with the pair formed by the secondary caller identifier and the main caller identifier of the calling terminal.

Typically, the respective main caller identifiers of the first and second terminals and the secondary caller identifier of the second terminal are telephone numbers of the MSISDN identifier type.

According to a variant, the second terminal is a mobile telephone communicating with the communication management platform via a mobile telephone network of the GSM, UMTS, LTE, 5G, or other type.

However, alternatively, the second terminal is a landline telephone attached to a PABX type of private telephone exchange, the landline telephone communicating with the communication management platform via an internal network.

The telephone number of the landline may also be a conventional subscriber number, for example in the case where an employee works from home and wants to communicate with his or her customers using his or her company's number (which will be the secondary number) as the identifier but his or her "private" number as the main number.

The development also relates to a computer program comprising instructions for implementing the method described above, when the instructions are executed by at least one processor.

Finally, the development also relates to a communication management platform for establishing a communication from a first communication terminal to a second communication terminal, the first and second communication terminals each having a main caller identifier, the second communication terminal further being associated with a secondary caller identifier. To do this, the communication management platform comprises:

- a communication module arranged to receive, from the first terminal, a first request for telephone communication comprising the secondary caller identifier of said second terminal, the sending of the first request opening a first communication channel,
- a processor arranged to obtain the main caller identifier of the second terminal associated at least with the secondary caller identifier and to obtain a voicemail system caller identifier associated at least with the secondary caller identifier.

The communication module is further arranged to send a second request for telephone communication to the second terminal, the second request comprising the main caller identifier of the second terminal, the sending of the second request opening a second communication channel.

The processor is further arranged for:

- in the event of receiving, from the second terminal, a favorable response to the second request, connecting the first and second communication channels in order to establish a telephone communication between the first and second terminals,
- otherwise:
  - connecting the first communication channel to a third communication channel opened between the communication management platform and a voicemail system with which the selected voicemail system caller identifier is associated, in order to establish a communication between the first terminal and the voicemail system.

BRIEF DESCRIPTION OF THE DRAWINGS

Other features, details and advantages will become apparent upon reading the detailed description below, and upon analyzing the appended drawings, in which.

DETAILED DESCRIPTION OF CERTAIN ILLUSTRATIVE EMBODIMENTS

Figure 1:
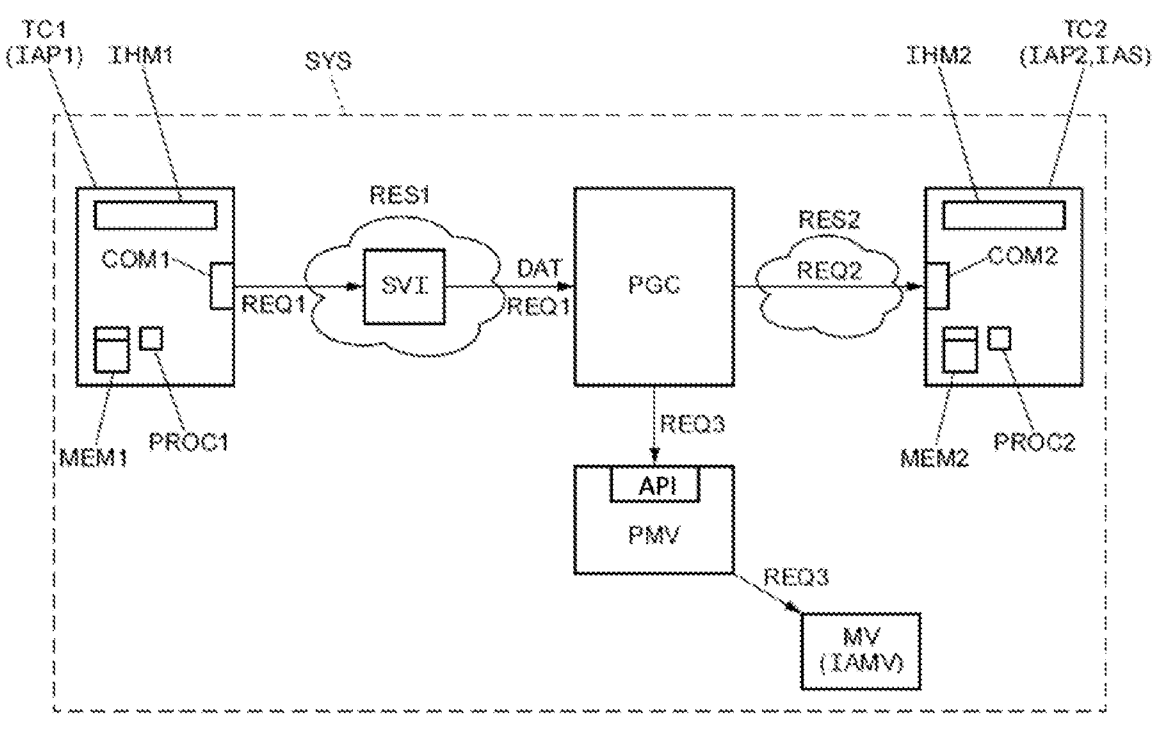
FIG. 1 illustrates a system comprising a first and a second communication terminal, a communication management platform according to the development, a voicemail system platform, and a voicemail system associated with a secondary caller identifier of the second communication terminal.

FIG. 1 illustrates a system SYS. The system SYS comprises a first communication terminal TC1, a communication management platform PGC, a second communication terminal TC2, a voicemail system platform PMV, and a voicemail system MV.

In the example presented here, the first communication terminal TC1, hereinafter first terminal TC1, is a mobile telephone. First terminal TC1 is for example a smart phone running the IOS, Android, or Linux operating system. Typically, first terminal TC1 comprises a SIM card (acronym for "Subscriber Identity Module") provided with a unique subscriber identifier IMSI (acronym for "International Mobile Subscriber Identity"). This unique subscriber identifier IMSI makes it possible to identify first terminal TC1 in the network to which the user of first terminal TC1 has subscribed. In the example illustrated in FIG. 1, this network, also called the home network, corresponds to a first network RES1. First network RES1 is for example a mobile type of network such as a GSM network (acronym for "Global System for Mobile Communications"), a UMTS network (acronym for "Universal Mobile Telecommunications System"), an LTE network (acronym for "Long Term Evolution"), or some other network.

Furthermore, the unique subscriber identifier IMSI is associated with a main caller identifier which corresponds to the telephone number which allows calling the user of first terminal TC1 and therefore to establish a communication with this user. In the remainder of this description, the main caller identifier of first terminal TC1 is denoted IAP1.

Alternatively, first terminal TC1 is a landline telephone attached to a PABX (acronym for "Private Automatic Branch eXchange") type of private telephone exchange. First network RES1 is for example an internal communication network such as the internal network of a company or a business. In such an embodiment, first terminal TC1 of course also has a main caller identifier IAP1.

First terminal TC1 comprises a communication module COM1, a Human-Machine interface IHM1, a memory MEM1, and a processor PROC1.

Communication module COM1 is arranged to communicate with second communication terminal TC2, hereinafter called second terminal TC2, via communication management platform PGC, of which a more detailed description will be provided in the remainder of the description. More particularly, communication module COM1 is arranged to send a first telephone communication request REQ1, hereinafter first request REQ1, to communication management platform PGC in order to establish a telephone communication with second terminal TC2.

The sending of first request REQ1 to communication management platform PGC opens a first communication channel. "Sending a request for telephone communication" is understood to mean that communication module COM1 sends a telephone call.

In the example illustrated in FIG. 1, communication module COM1 communicates with communication management platform PGC via first network RES1. In the case where first terminal TC1 is a mobile telephone, communication module COM1 is arranged to communicate with communication management platform PGC using GSM, UMTS, LTE, or some other type of technology.

It is known to those skilled in the art that there are many different types of data communication networks, for example cellular or non-cellular radio communication networks, and that, depending on the embodiment, communication module COM1 may integrate one or more communication sub-modules, for example for radio frequency communication and configured for the transmission and reception of radio frequency signals, according to one or more technologies such as TDMA, FDMA, OFDMA, CDMA, or one or more radio communication standards, such as GSM, EDGE, CDMA, UMTS, HSPA, LTE, LTE-A, WiFi (IEEE 802.11) and WiMAX (IEEE 802.16), or variants or evolutions thereof, that are currently known or subsequently developed, for example 5G.

Furthermore, as illustrated in FIG. 1, first network RES1 may comprise an interactive voice response server SVI.

An interactive voice response server (also known by the acronym IVR), such as interactive voice response server SVI, designates telephony technology enabling a user or customer, here typically the user of first terminal TC1, to interact with communication management platform PGC. Typically, an interactive voice response server is set up by a company to facilitate the processing of customer requests.

An interactive voice response server is thus capable of receiving and sending telephone calls. Interaction with a user is achieved through configurable voice menus tailored to react to different user inputs. These inputs may be in the form of the user pressing on keys (possibly virtual) of the communication terminal, here terminal TC1, or spoken information provided by the user. The operation of an interactive voice response server, whether it concerns the processing of telephone calls, the configuration of voice menus, or the reaction of the interactive voice response server to user input, follows a pre-programmed logic.

The user pressing on keys of the communication terminal generates sound frequencies corresponding to DTMF codes (acronym for "Dual-Tone Multi-Frequency"). A DTMF tone thus makes it possible to express concretely the user's choice among a certain number of prerecorded proposals presented to the user in the form of a voice menu. As explained above, the user may also provide input via spoken information when the interactive voice response server is equipped with voice recognition technology. The advantage of such spoken information is that it allows acquiring information that cannot be communicated by the user to the interactive voice response server solely by pressing keys. Spoken information may also be an alternative for the user to make a choice in a voice menu.

Interactive voice response server SVI is configured to route, in addition to first request REQ1, input data characterizing a service requested by the user of first terminal TC1, to communication management platform PGC. These input data are generated on the basis of the inputs provided by the user of first terminal TC1.

Human-Machine interface IHM1 is arranged to enable the user of first terminal TC1 to interact with first terminal TC1. For example, Human-Machine interface IHM1 is a screen, a keyboard, or can be viewed as a combination of a screen and keyboard. Advantageously, Human-Machine interface IHM1 is arranged to display an incoming telephone call, thus signaling to the user of first terminal TC1 that he or she is receiving a telephone call.

Advantageously, Human-Machine interface IHM1 is further arranged to enable the user of first terminal TC1 to dial a telephone number, trigger the sending of a telephone call, and thus communicate with the user of second terminal TC2.

User interaction with Human-Machine Interface IHM1 may be achieved via a telephone dialer type of application (also called dialler).

As explained above, first request REQ1 can be routed to the communication management platform PGC via interactive voice response server SVI of first network RES1. Human-Machine interface IHM1 can then enable the user of first terminal TC1 to interact with interactive voice response server SVI. Thus, during the telephone call corresponding to first request REQ1, the user of first terminal TC1 may be required, in response to the various voice menus presented to him or her, to use a telephone dialer type of application to press one or more keys. The pressing of the keys by the user then generates sound frequencies corresponding to DTMF codes. These DTMF codes serve as inputs for the preprogrammed logic of interactive voice response server SVI.

Memory MEM1 is arranged to store instructions of a computer program whose execution by processor PROC1 results in the operation of first terminal TC1. For example, processor PROC1 is arranged to generate first request REQ1.

Typically, first request REQ1 includes main caller identifier IAP1 of first terminal TC1 and a caller identifier of second terminal TC2. Here, the caller identifier of second terminal TC2 included in first request REQ1 is a secondary caller identifier IAS, also called an alias number, associated with a main caller identifier IAP2 of second terminal TC2. Indeed, in the context of the development, the user of the first terminal only knows the alias number, and not the real number, of second terminal TC2. Of course, when the user of first terminal TC1 knows main caller identifier IAP2, first request REQ1 may include main caller identifier IAP2 of second terminal TC2.

As explained above, first terminal TC1 is for example a mobile telephone therefore comprising a SIM card having a unique subscriber identifier IMSI associated with a main caller identifier IAP1. Memory MEM1 may therefore also be arranged to store such data.

Communication management platform PGC, hereinafter platform PGC, is arranged to establish a communication between first terminal TC1 and second terminal TC2 when the telephone call corresponding to first request REQ1 is sent by first terminal TC1 to second terminal TC2.

In the context of the development, the user of first terminal TC1 attempts to establish a telephone communication with the user of second terminal TC2 via secondary caller identifier IAS, or alias number, of second terminal TC2. Platform PGC may also be called an “alias platform”.

In other words, platform PGC is arranged to send, upon receiving first request REQ1, a second request for telephone communication REQ2, hereinafter second request REQ2, to second terminal TC2. Second request REQ2 includes main caller identifier IAP1 of first terminal TC1 and main caller identifier IAP2 of second terminal. Similarly to first request REQ1, second request REQ2 corresponds to a telephone call.

Furthermore, platform PGC may also be arranged to establish a communication between first terminal TC1 and the voicemail system MV selected at least on the basis of secondary caller identifier IAS of second terminal TC2. Platform PGC is therefore arranged to send a third request for telephone communication REQ3, hereinafter third request REQ3, to voicemail system MV. Here again, third request REQ3 corresponds to a telephone call. Third request REQ3 includes main caller identifier IAP1 of first terminal TC1 and voicemail system caller identifier IAMV of voicemail system MV.

Third request REQ3 can be broken down into two calls: an API call and a voice call. The API call is sent to voicemail system MV via a specific channel (also called “data channel” in the literature) that is separate from the conventional communication channels. The API call includes voicemail system caller identifier IAMV. As for the voice call, it is intended to allow the user of first terminal TC1 to record a voice message on voicemail system MV.

As explained in the remainder of the description, the sending of third request REQ3 to voicemail system MV may be implemented via voicemail system platform PMV.

Figure 2:
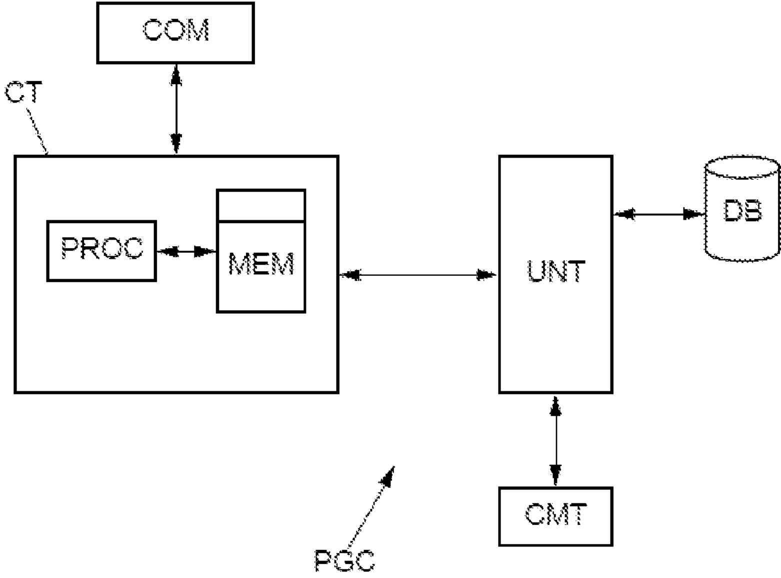
FIG. 2 illustrates the communication management platform of the system shown in FIG. 1.

As illustrated in FIG. 2, platform PGC comprises a communication module COM, a processing unit UNT, a switching center CMT, a database DB, and a processing circuit CT.

Switching module COM is arranged to communicate with first terminal TC1. As explained above, first terminal TC1 is for example a mobile telephone identifiable within first network RES1 to which the user of first terminal TC1 is subscribed. It is then understood that communication module COM of platform PGC is arranged to communicate with first terminal TC1 via first network RES1. Communication module COM is arranged to receive first request REQ1.

As explained above, first request REQ1 can be routed to platform PGC via interactive voice response server SVI. In such case, communication module COM is further arranged to receive, in addition to first request REQ1, the input data characterizing a service requested by the user of first terminal TC1. These input data are generated via one or more user interactions with a dialer type of application of first terminal TC1 and/or via spoken information provided by the user of first terminal TC1.

Communication module COM is further arranged to communicate with second terminal TC2 via a second network RES2. First and second networks RES1 and RES2 may be the same network or separate networks. It is then understood that communication module COM is arranged to send second request REQ2 to second terminal TC2. Sending second request REQ2 thus opens a second communication channel.

Communication module COM is further arranged to communicate with voicemail system MV selected by management platform PGC on the basis of at least secondary caller identifier IAS of second terminal TC2. It is understood that communication module COM is arranged to send third request REQ3 to voicemail system MV. Sending third request REQ3 to the voicemail system opens a third communication channel. More specifically, as explained in the remainder of the description, communication module COM is arranged to send third request REQ3 to voicemail system platform PMV so that the latter routes third request REQ3 to voicemail system MV.

As explained above, the sending of third request REQ3 means sending an API call and a voice call. In this case, the third communication channel corresponds to the communication channel carrying the voice call and therefore enabling the user of the first terminal to leave a voice message. As for the API call, it is sent via a data channel that is independent of the third communication channel. The content of the component sub-requests of third request REQ3 will be described in detail below.

Communication module COM is also arranged to receive a possible favorable response to second request REQ2 from second terminal TC2.

Processing unit UNT is arranged to implement a method which allows redirecting (or routing) the telephone call from first terminal TC1 to second terminal TC2 when this telephone call is accepted by the user of second terminal TC2. Conversely, the method implemented by processing unit UNT allows redirecting (or routing) the telephone call from first terminal TC 1 to voicemail system MV associated with secondary caller identifier IAS of second terminal TC2 if no favorable response to second request REQ2 is received at platform PGC from second terminal TC2. This method will be described in more detail in the remainder of the description with reference to FIG. 3 then FIG. 4.

Switching center CMT is connected to processing unit UNT and is arranged to handle the path of the communication established from first terminal TC1 to second terminal TC2 or to the selected voicemail system MV.

Switching center CMT is connected directly or indirectly to network devices that are well known, for example such as a mobile switching center (known by the acronym MSC) of a mobile telecommunications network. Alternatively, switching center CMT may be connected to a local switch of a fixed-line telecommunications network. In the case of a fixed-line telecommunications network, the local switch handles local calls from subscribers of the same switch as well as incoming and outgoing traffic with other switches. Typically, one of the main functions of switching center CMT is a call control function implementing various operations such as the decoding of address information and the routing of telephone calls from calling first terminal TC1 to called second terminal TC2. Such a function is associated with certain call features such as:

- placing the call on hold,
- transferring the call to a voicemail system when the communication terminal called, here second terminal TC2, does not pick up,
- possibly a particular ringtone indicating to the user of the calling terminal, here first terminal TC 1, that the other party is already on a call or cannot be reached,
- before pickup mode, which consists of providing the user of the calling terminal with a message to indicate waiting while the called terminal rings.

Regarding transfer of a call to a voicemail system, the method described below implemented by processing unit UNT at platform PGC makes it possible, when the telephone call made by first terminal TC1 uses secondary caller identifier IAS of the second terminal, to redirect the telephone call in question to the voicemail system selected by platform PGC and not to the voicemail system (not represented here) associated with main caller identifier IAP2 of second terminal TC2.

Database DB is connected to or integrated with platform PGC. More precisely, database DB is connected to processing unit UNT.

In FIG. 2, database DB is stored on platform PGC. However, more generally, database DB is simply connected to platform PGC. For example, database DB can be remotely accessed by platform PGC.

Database DB is arranged to store data relating to communication terminals likely to request telephone communication via platform PGC.

For example, the main caller identifier of each communication terminal is stored in database DB. For example, main caller identifier IAP1 of first terminal TC1 is stored in database DB, as is main caller identifier IAP2 of second terminal TC2. Within database DB, each main caller identifier is associated with one or more secondary caller identifiers if the user of the terminal identified by the main caller identifier has subscribed to an anonymization service in order to have access to such secondary caller identifiers, or alias numbers. Similarly, each secondary caller identifier is associated with one or more main caller identifiers.

For example, database DB indicates that first terminal TC1, associated with main caller identifier IAP1, does not have a secondary caller identifier. Conversely, database DB indicates that second terminal TC2, associated with main caller identifier IAP2, is associated at least with secondary caller identifier IAS. It is possible for a same communication terminal to be associated with several secondary caller identifiers. It is also possible that a same secondary caller identifier is shared by several main caller identifiers. In other words, a same alias number may be shared by several users having different real telephone numbers.

In addition, database DB is also arranged to store a voicemail system caller identifier associated with each listed voicemail system. Thus, when a main caller identifier is associated with a voicemail system, the voicemail system caller identifier associated with this voicemail system is associated with this main caller identifier within database DB. Similarly, when a secondary caller identifier is associated with a voicemail system, the voicemail system caller identifier associated with this voicemail system is associated with this secondary caller identifier within the database DB.

While a secondary caller identifier may be shared by several main caller identifiers, the same holds true for the voicemail system associated with such a secondary caller identifier and therefore for the voicemail system caller identifier corresponding to this voicemail system. Such a voicemail system caller identifier allows platform PGC to establish a telephone communication with the associated voicemail system. For example, secondary caller identifier IAS is associated at least with voicemail system caller identifier IAMV corresponding to voicemail system MV. As will be described in detail below, voicemail system caller identifier IAMV is sent by management platform PGC to the voicemail system platform in order to allow establishing the telephone communication between first terminal TC1 and the correct voicemail system MV.

In the example illustrated in FIG. 1, database DB therefore stores voicemail system caller identifier IAMV of voicemail system MV.

In addition, a main or secondary caller identifier may be associated with several voicemail systems. In such case, the main or secondary caller identifier is associated, within database DB, with several voicemail system caller identifiers, each associated with a separate voicemail system.

Thus, in one or more embodiments, secondary caller identifier IAS of second terminal TC2 is associated, within database DB, with a plurality of voicemail system caller identifiers. Moreover, as explained above, when first request REQ1 is routed to platform PGC via interactive voice response server SVI, platform PGC receives, in addition to first request REQ1, input data characterizing a service requested by the user of first terminal TC1. It may then be provided that, within database DB, when a main or secondary caller identifier is associated with several voicemail system caller identifiers, each of these voicemail system caller identifiers corresponds to a service.

Consider for example a situation in which the user of first terminal TC1 uses secondary caller identifier IAS associated with main caller identifier IAP2 of second terminal TC2 and the user, during the telephone call corresponding to first request REQ1, provides one or more inputs to interactive voice response server SVI. Platform PGC then receives first request REQ1, comprising main caller identifier IAP1 of first terminal TC1 and secondary caller identifier IAS of second terminal TC2, as well as the input data generated on the basis of the inputs provided by the user of first terminal TC1. These input data characterize a service requested by the user of first terminal TC1. Platform PGC then accesses database DB in order to select a voicemail system caller identifier associated at least with secondary caller identifier IAS. In particular, if several voicemail system caller identifiers are associated with secondary caller identifier IAS, then each voicemail system caller identifier may correspond to a possible service. It can then be said that each voicemail system corresponding to a voicemail system caller identifier is dedicated to a service. Platform PGC can then select, among the voicemail system caller identifiers associated with secondary caller identifier IAS, the voicemail system caller identifier corresponding to the service requested by the user of first terminal TC1.

The embodiment described above therefore uses interactive voice response server SVI to select a voicemail system adapted to the type of communication requested by the user of first terminal TC1. More specifically, interactive voice response server SVI can allow determining a service requested by the user of first TC1 and the appropriate voicemail system for this service. In such an embodiment, there is therefore an association between secondary caller identifier IAS, a requested service, and a voicemail system. In other words, selection of the appropriate voicemail system is based on the determination of the secondary caller identifier dialed by the user of first terminal TC1 then of the service requested by this user and deduced from the data generated via interactive voice response server SVI. Furthermore, as explained above, a same secondary caller identifier may be associated with one or more main caller identifiers.

When a secondary caller identifier is associated with several main caller identifiers, it may be provided that the pair formed by the secondary caller identifier and the requested service are associated not only with a voicemail system but also with a main caller identifier. In the case described here, for example, secondary caller identifier IAS and a given service requested by the user of first terminal TC1 may together be associated with main caller identifier IAP2 of second terminal TC2 in addition to voicemail system MV.

It is possible to proceed differently in order to determine the appropriate voicemail system, therefore without using interactive voice response server SVI and therefore without determining the service requested by the user of first terminal TC1.

For example, instead of an association between a secondary caller identifier such as secondary caller identifier IAS, an identified service and a voicemail system, and possibly main caller identifier IAP2, platform PGC may generate an association between a secondary caller identifier, main caller identifier IAP1 of first terminal TC1, and a voicemail system. Indeed, typically, the user of first terminal TC1 is a customer while the user of second terminal TC2 is an adviser employed by a company, a business, or civil service. It may then be advantageous for the customer to systematically be placed in communication, each time he or she so desires, with the same adviser, at least for a certain period of time or until resolution of a problem encountered by the customer.

In order to improve follow-up for this customer, it is therefore relevant, when the customer dials secondary caller identifier IAS with first terminal TC1, to generate at platform PGC an association between secondary caller identifier IAS of second terminal TC2, main caller identifier IAP1 of first terminal TC1, and a voicemail system. Concretely, therefore, each time the user of first terminal TC1 dials secondary caller identifier IAS of second terminal TC2, platform PGC retrieves both the secondary caller identifier IAS and main caller identifier IAP1 of first terminal TC1 and finds, for example in database DB, the associated voicemail system. This voicemail system may be selected the first time the user of first terminal TC1 dials secondary caller identifier IAS, and the obtained association is then stored in memory by platform PGC, for example in database DB.

Furthermore, as mentioned above, a secondary caller identifier, such as secondary caller identifier IAS, may be associated with not one but with several main caller identifiers, for example main caller identifier IAP2 in the case discussed here.

Thus, when a secondary caller identifier is associated with several main caller identifiers, it may be provided that the pair formed by the secondary caller identifier and main caller identifier IAP1 of first terminal TC1 is associated not only with a voicemail system but also with a main caller identifier. In the case described here, for example, secondary caller identifier IAS and main caller identifier IAP1 of first terminal TC1 may together be associated with main caller identifier IAP2 of second terminal TC2 in addition to voicemail system MV.

Of course, database DB may store other data or information concerning the voicemail system(s) associated with each main or secondary caller identifier of each communication terminal or enabling the routing of telephone communication requests , i.e. the redirection (or routing) of telephone calls.

Processing circuit CT is arranged to control platform PGC. More specifically, processing circuit CT is arranged to control communication module COM and processing unit UNT.

As illustrated in FIG. 2, processing circuit CT comprises a memory MEM and a processor PROC.

Memory MEM is arranged to store instructions of a computer program whose execution by processor PROC results in the operation of processing circuit CT and therefore of platform PGC. The operation of processing circuit CT corresponds more specifically to implementing the method detailed below. For example, processing circuit CT is arranged to generate second request REQ2 and, if necessary, third request REQ3.

Furthermore, in a variant, processing circuit CT is further arranged to modify second request REQ2 so that this request includes information or a tag concerning the fact that the telephone call corresponding to first request REQ1 was sent to secondary caller identifier IAS and not to main caller identifier IAP2.

Such information or such a tag enables the user of second terminal TC2 to be aware that the call concerns his or her "alias" number and not his or her real number. Typically this information may be a tag in the ISUP field (acronym for "ISDN User Part") corresponding to the Generic Number, also called "From" in SIP (acronym for "Session Initiation Protocol") or NDS in ETSI (acronym for "European Telecommunications Standards Institute"). This information may also be a push from an Android or iOS application sent in parallel by platform PGC.

Second terminal TC2 is a mobile telephone in the example illustrated in FIG. 1. Second terminal TC2 is for example a smart phone running the iOS, Android, or Linux operating system. Typically, second terminal TC2 therefore comprises a SIM card provided with a unique subscriber identifier IMSI. Similarly to first terminal TC1, this unique subscriber identifier IMSI allows identifying second terminal TC2 in the network to which the user of second terminal TC2 has subscribed. In the example illustrated in FIG. 1, this network, also called the home network, corresponds to second network RES2. Second network RES2 is for example a mobile network such as a GSM network, a UMTS network, an LTE network, or some other network.

Furthermore, unique subscriber identifier IMSI is associated with main caller identifier IAP2 which corresponds to the telephone number enabling the user of second terminal TC2 to be called and therefore to establish a communication with this user.

Alternatively, second terminal TC2 is a landline telephone attached to a PABX type of private telephone exchange. Second network RES2 is for example an internal communication network, for example the internal network of a company or a business. In such an embodiment as well, second terminal TC2 of course has a main caller identifier IAP2.

In the context of the development, second terminal TC2 also has at least one secondary caller identifier IAS. Secondary caller identifier IAS corresponds to a telephone number, referred to as "alias number", which also allows calling the user of second terminal TC2 and establishing a telephone communication with this user. In the example described here, this alias number is the number used by the user of first terminal TC1 to call the user of second terminal TC2. This alias number, therefore corresponding to secondary caller identifier IAS, can be viewed as a "virtual" telephone number associated with the "real" telephone number, therefore corresponding to main caller identifier IAP2. As explained below, voicemail system MV of system SYS illustrated in FIG. 1 actually corresponds to a voicemail system of secondary caller identifier IAS of second terminal TC2. Of course, main caller identifier IAP2 also has a voicemail system (not shown in FIG. 1).

Second terminal TC2 comprises a communication module COM2, a Human-Machine interface IHM2, a memory MEM2, and a processor PROC2.

Communication module COM2 is arranged to communicate with first terminal TC1 via platform PGC. More particularly, communication module COM2 is arranged to receive second request REQ2, coming from platform PGC in order to establish a telephone communication with first terminal TC1. As with first request REQ1 sent by first terminal TC1 to communication management platform PGC, second request REQ2 is a telephone call sent by platform PGC to second terminal TC2.

In the example illustrated in FIG. 1, communication module COM2 communicates with platform PGC via second network RES2. It is understood that, in the case where second terminal TC2 is a mobile telephone, communication module COM2 is arranged to communicate with platform PGC using a GSM or UMTS type of technology.

As explained above for first network RES1, there are many different types of data communication networks, for example cellular or non-cellular radio communication networks. Thus, depending on the embodiment, communication module COM2 may integrate one or more communication sub-modules, for example for radio frequency communication and configured for the transmission and reception of radio frequency signals, according to one or more technologies such as TDMA, FDMA, OFDMA, CDMA, or one or more radio communication standards such as GSM, EDGE, CDMA, UMTS, HSPA, LTE, LTE-A, WiFi (IEEE 802.11) and WiMAX (IEEE 802.16), or variants or evolutions thereof, that are currently known or subsequently developed.

Human-Machine interface IHM2 is arranged to enable the user of second terminal TC2 to interact with second terminal TC2. For example, Human-Machine Interface HMI2 is a screen, a keyboard, or can be viewed as a combination of a screen and keyboard. Advantageously, Human-Machine interface IHM2 is arranged to display an incoming telephone call, thus signaling to the user of second terminal TC2 that he or she is receiving a telephone call.

Advantageously, Human-Machine interface IHM2 is further arranged to enable the user of second terminal TC2 to accept the incoming telephone call and thus to communicate with the user of first terminal TC1. For example, when an incoming call is displayed to the user of second terminal TC2, the user can take the call, more commonly referred to as "picking up" the call, using a physical button on the keyboard or a virtual button on a screen with which the user interacts by touch. The user of second terminal TC2 may also, via Human-Machine interface IHM2, refuse the incoming call using another physical button on the keyboard or a virtual button on the screen.

In one or more embodiments, the interaction of the user of second terminal TC2 with Human-Machine interface IHM2 is carried out via a telephone dialer type of application.

Human Machine Interface HMI2 may also be configured to indicate to the user whether the call is for main caller identifier IAP2 or secondary caller identifier IAS. This may be indicated by a different ring tone or a different graphical display. This information is transmitted in particular by platform PGC, by modifying second request REQ2.

Memory MEM2 is arranged to store instructions of a computer program whose execution by processor PROC2 results in the operation of second terminal TC2. For example, processor PROC2 is arranged to generate data representative of an interaction of the user of second terminal TC2 with Human-Machine interface IHM2. In the case where the interaction of the user of second terminal TC2 with Human-Machine interface IHM2 corresponds to an authorization to establish a telephone communication, data representative of this authorization are generated. Similarly, in the case where the interaction of the user of second terminal TC2 with Human-Machine interface IHM2 corresponds to a refusal to establish a telephone communication, data representative of this refusal are generated.

As explained above, communication module COM2 is arranged to communicate with platform PGC and may then be arranged for:

- if the user of second terminal TC2 accepts the telephone call corresponding to second request REQ2, transmitting the favorable response to second request REQ2 to platform PGC, for example in the form of data representative of an interaction of the user of second terminal TC2 with Human-Machine interface IHM2 in order to authorize accepting the establishment of the telephone communication,
- if the user of second terminal TC2 refuses the telephone call corresponding to second request REQ2, transmitting the unfavorable response to second request REQ2 to platform PGC, for example in the form of data representative of an interaction of the user of second terminal TC2 with Human-Machine interface IHM2 in order to refuse establishing the telephone call.

Second terminal TC2 is for example a mobile telephone therefore comprising a SIM card provided with a unique subscriber identifier IMSI with which a main caller identifier IAP2 is associated. In addition, second terminal TC2 has a secondary caller identifier IAS. Memory MEM2 may therefore also be arranged to store such data.

The voicemail system platform PMV, hereinafter platform PMV, is arranged to receive third request REQ3 from platform PGC in order to establish a telephone communication between the user of first terminal TC1 and the voicemail system selected by platform PGC. This voicemail system is for example voicemail system MV illustrated in FIG. 1.

More specifically, platform PMV is arranged to extract, from third request REQ3 sent by platform PGC, the information required to determine the voicemail system for which third request REQ3 is intended. Platform PMV is thus configured to extract voicemail system caller identifier IAMV from third request REQ3.

Once voicemail system caller identifier IAMV has been extracted, platform PMV is arranged to route the third request to voicemail system MV associated with voicemail system caller identifier IAMV. Platform PMV thus allows opening the third communication channel between platform PGC and voicemail system MV.

As illustrated in FIG. 1, platform PMV comprises an application programming interface API.

The application programming interface (also known by the acronym API) constitutes a facade through which platform PMV offers services to platform PGC. Among these services, the application programming interface API provides platform PGC with the voicemail system caller identifiers of the voicemail systems, such as voicemail system MV, accessible through platform PMV. Voicemail system caller identifiers can thus be stored in database DB.

The application programming interface API is further arranged to implement the reception of third request REQ3 sent by platform PGC in preparation for routing third request REQ3 to voicemail system MV.

As explained above, the sending of third request REQ3 corresponds to sending an API call and a voice call. It is therefore understood that the API call is received and handled by the application programming interface API.

Voicemail system MV is arranged to receive request REQ3 sent by platform PGC and routed by platform PMV in order to establish a communication with the user of first terminal TC1. As explained above, voicemail system MV is associated with secondary caller identifier IAS of second terminal TC2. It is understood that voicemail system MV is distinct from the voicemail system associated with main caller identifier IAP2 of second terminal TC2.

In addition, voicemail system MV may be associated with a service. Thus, when first request REQ1 is sent by first terminal TC1 to platform PGC via interactive voice response server SVI, interactive voice response server SVI generates input data by using the inputs provided by the user of first terminal TC1. These input data are transmitted with first request REQ1 to platform PGC which determines the service requested by the user on the basis of these input data. The determined service makes it possible to select, among the voicemail system caller identifiers associated with secondary caller identifier IAS, the voicemail system caller identifier, here the voicemail system caller identifier IAMV associated with the appropriate voicemail system MV for the service requested. This voicemail system is thus the designated voicemail system for receiving and storing voice messages from users requesting a same service.

The functions of voicemail system MV are well known to those skilled in the art. As an example, voicemail system MV is arranged to store one or more voice messages left by the user of a communication terminal, here the user of first terminal TC1, when he or she is unable to establish a telephone communication with the user of second terminal TC2. The stored voice messages are intended to be played back for the user of second terminal TC2 when the user accesses voicemail system MV.

Voicemail system MV is arranged to implement other optional functions, such as playing an automatic voice message or one recorded by the user of second terminal TC2 to announce the unavailability of the user of second terminal TC2 and inviting the user of first terminal TC1 to leave a voice message.

Figure 3:
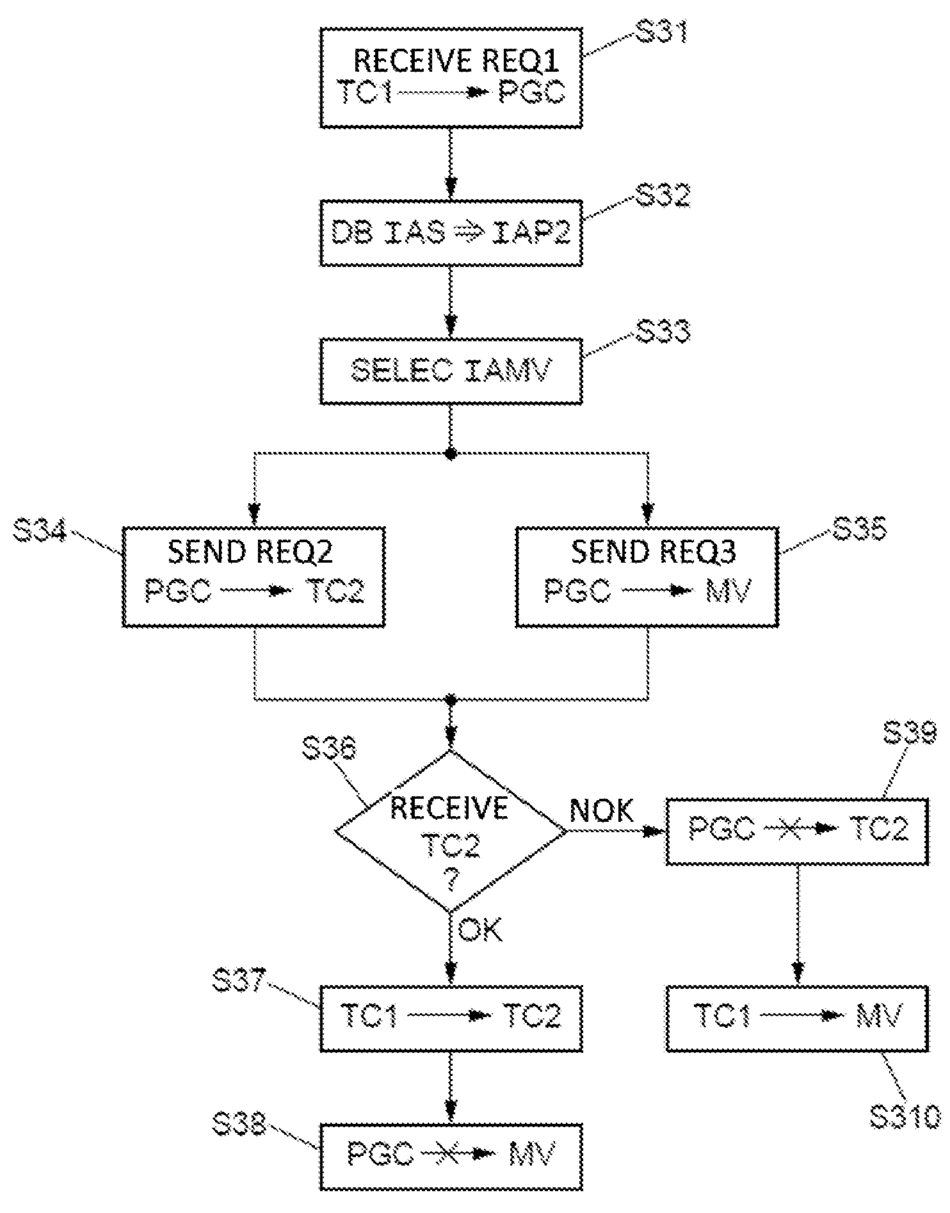
FIG. 3 illustrates a method for establishing a telephone communication from the first communication terminal to the second communication terminal according to a first embodiment of the development.
Figure 4:
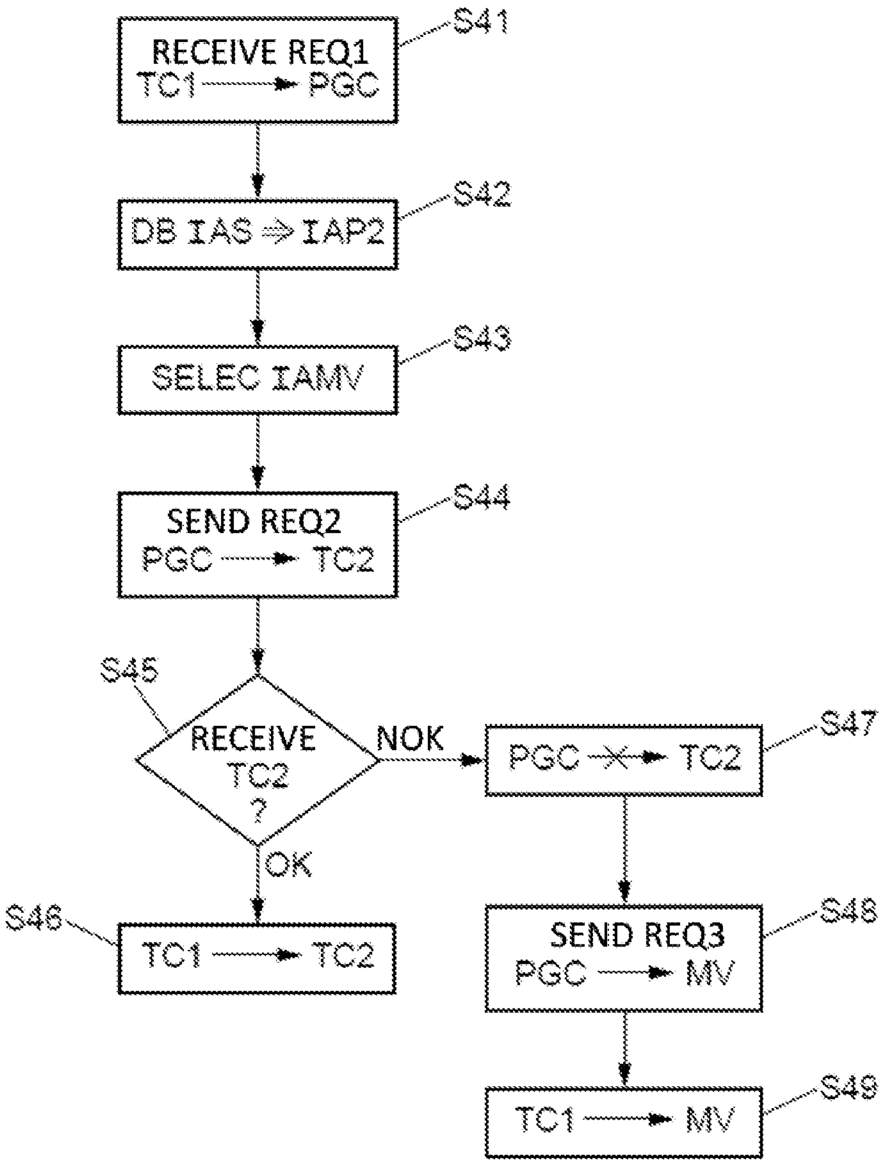
FIG. 4 illustrates the method for establishing a telephone communication from the first communication terminal to the second terminal according to a second embodiment of the development.

A method for establishing a telephone communication from first terminal TC1 to second terminal TC2 will now be described with reference to FIG. 3 according to a first embodiment, then with reference to FIG. 4 according to a second embodiment. Of course, this method also aims to establish, if need be, a telephone communication between first terminal TC1 and voicemail system MV associated with secondary caller identifier IAS of second terminal TC2.

Typically, the context for implementing the method is as follows: the user of first terminal TC1 wishes to contact the user of second terminal TC2 via a telephone communication. Second terminal TC2 is associated with a main caller identifier IAP2 which corresponds to the "real" number carrying the communication, and with a secondary caller identifier IAS which corresponds to an alias number or "virtual" number. The user of first terminal TC1 uses secondary caller identifier IAS to attempt to establish a telephone communication with the user of second terminal TC2.

For example, to start the telephone call the user of first terminal TC1 dials, using a telephone dialer type of application on first terminal TC1, the alias number corresponding to secondary caller identifier IAS. In other words, first terminal TC1 generates a first request for telephone communication REQ1. This first request REQ1 includes main caller identifier IAP1 of first terminal TC1 and secondary caller identifier IAS of second terminal TC2. This first request REQ1, which therefore corresponds to a telephone call, is sent by communication module COM1 to platform PGC.

The first embodiment of the method for establishing a telephone communication from first terminal TC1 to second terminal TC1 is described below with reference to FIG. 3.

During a step S31, platform PGC receives an incoming call, namely first request REQ1 from first terminal TC1. More specifically, first request REQ1 is received by communication module COM of platform PGC. First request REQ1 is sent by first terminal TC1 to platform PGC via a first communication channel opened for this purpose. It is then generally said that platform PGC maintains the call coming from first terminal TC1.

In one or more embodiments, and as illustrated in FIG. 1, first request REQ1 is routed to platform PGC via first network RES1, and more specifically via interactive voice response server SVI. Thus, during the telephone call corresponding to first request REQ1, the user of first terminal TC1 is required to interact with platform PGC via interactive voice response server SVI.

The user interacts for example with interactive voice response server SVI via Human-Machine interface IHM2. Thus, during the telephone call corresponding to first request REQ1, the user of first terminal TC1 uses, in response to the various voice menus presented to him or her, a telephone dialer type of application to press one or more keys. The user's pressing of the keys then generates sound frequencies corresponding to DTMF codes. These DTMF codes constitute inputs for the pre-programmed logic of interactive voice response server SVI.

Optionally, the user of first terminal TC1 provides inputs to interactive voice response server SVI via spoken information.

Platform PGC then receives not only first request REQ1, including main caller identifier IAP1 of first terminal TC1 and secondary caller identifier IAS of second terminal TC2, but also the input data generated on the basis of the inputs provided by the user of first terminal TC1. These input data characterize a service requested by the user of first terminal TC1.

During a step S32, platform PGC searches, within database DB, for main caller identifier IAP2 associated at least with secondary caller identifier IAS. Database DB does indeed store a match between a main caller identifier of a terminal and the associated secondary caller identifier(s) as well as the voicemail system caller identifier(s) of each secondary caller identifier. Thus, during this step, platform PGC determines main caller identifier IAP2 of second terminal TC2 associated with secondary caller identifier IAS of this same second terminal TC2.

As explained above, a same secondary caller identifier may be associated with several main caller identifiers. Thus, in the case described here, secondary caller identifier IAS may be associated not only with main caller identifier IAP2 but also with other main caller identifiers.

The present development then proposes two solutions for determining the appropriate main caller identifier, here for example main caller identifier IAP2.

A first solution is to select main caller identifier IAP2 not only on the basis of secondary caller identifier IAS but also on the basis of the service requested by the user of first terminal TC1. This service may be identified using the inputs provided by the user of first terminal TC1 via interactive voice response server SVI. This solution assumes that each pair formed by a secondary caller identifier and a given service is associated with a main caller identifier such as main caller identifier IAP2 of second terminal TC2. This association is for example pre-recorded in database DB.

A second solution is to select main caller identifier IAP2 not only on the basis of secondary caller identifier IAS but also on the basis of main caller identifier IAP1 associated with first terminal TC1. This solution typically can be implemented by associating, for example during the first call from the user of first terminal TC1, main caller identifier IAP1 of first terminal TC1 combined with the secondary caller identifier dialed by the user of first terminal TC1, with main caller identifier IAP2. This may also be done by declaring beforehand in the database a link between first terminal TC1, main caller identifier IAP2, and secondary caller identifier IAS. This is useful in the case of customer service where a customer adviser will monitor the case of a same customer. When the customer calls, if the customer advisor is not available, the customer is invited to leave a message on the customer advisor's "personal" voicemail system. This generated association may be stored for example in database DB.

When this second solution is implemented, it may thus be arranged within platform PGC to collect secondary caller identifier IAS and main caller identifier IAP1 upon receiving first request REQ1, and to search, for example in database DB, for whether such a combination is already associated with a main caller identifier such as main caller identifier IAP2. If such is the case, then main caller identifier IAP2 is then retrieved. Otherwise, platform PGC selects a main caller identifier, here main caller identifier IAP2, in particular if main caller identifier IAP2 is available. The association thus generated is then stored in database DB. Alternatively, if no match is found, the caller may either be encouraged to try later by platform PGC, or platform PGC may forward the call to another destination, such as a company's centralized help desk.

The person skilled in the art understands that it is possible to use one or the other of the first and second solutions described above or to use them together in combination. For example, the pair formed by secondary caller identifier IAS and voicemail system MV, therefore the corresponding voicemail system caller identifier IAMV, may be associated both with the service requested by the user of first terminal TC1 and with main caller identifier IAP1. It is also possible that, within database DB, certain pairs formed by a secondary caller identifier and a voicemail system are associated with a given service while other pairs are associated with a calling main caller identifier such as main caller identifier IAP1 of first terminal TC1.

During a step S33, platform PGC selects, within database DB, a voicemail system caller identifier associated at least with secondary caller identifier IAS of second terminal TC2.

The above considerations also apply to the selection of the voicemail system caller identifier.

Thus, if multiple voicemail system caller identifiers are associated with secondary caller identifier IAS, then each voicemail system caller identifier can correspond to a service. Platform PGC can then select, among the voicemail system caller identifiers associated with secondary caller identifier IAS, the voicemail system caller identifier corresponding to the service requested by the user of first terminal TC1. This service is for example determined on the basis of the input data received by platform PGC.

Thus, when first request REQ1 is routed to platform PGC via interactive voice response server SVI, platform PGC receives, in addition to first request REQ1, input data characterizing the service requested by the user of first terminal TC1. Platform PGC then selects, among the voicemail system caller identifiers associated with secondary caller identifier IAS, the voicemail system caller identifier corresponding to this service. In the example illustrated in FIG. 1, voicemail system caller identifier IAMV associated with voicemail system MV is selected.

In such case, it is understood that secondary caller identifier IAS, the service requested by the user of first terminal TC1, and voicemail system MV, therefore voicemail system caller identifier IAMV, are associated, for example within database DB which platform PGC can access.

In addition, it is also possible to select voicemail system MV, and therefore voicemail system caller identifier IAMV, on the basis of secondary caller identifier IAS and main caller identifier IAP1 of first terminal TC1.

In this case, platform PGC retrieves both the secondary caller identifier IAS and main caller identifier IAP1 and then determines the associated voicemail system, here voicemail system MV. This association is for example stored in database DB.

More specifically, during this step S33, platform PGC determines whether the pair formed by secondary caller identifier IAS and main caller identifier IAP1 is already associated, for example in database DB, with a voicemail system such as voicemail system MV, therefore with voicemail system caller identifier IAMV. If so, voicemail system caller identifier IAMV is retrieved by platform PGC. Otherwise, a voicemail system, advantageously available, is selected by platform PGC and then associated with secondary caller identifier IAS and main caller identifier IAP1. Such an association makes it possible, during a subsequent call from the user of first terminal TC1 redialing secondary caller identifier IAS, to again retrieve voicemail system identifier IAMV.

Once the main caller identifier of the second terminal and the voicemail system caller identifier associated with the secondary caller identifier have been obtained, platform PGC generates, during a step S34, a second request for telephone communication REQ2. Second request REQ2 includes main caller identifier IAP1 of first terminal TC1 and main caller identifier IAP2 of second terminal TC2. Still during this step S34, platform PGC sends second request REQ2 to second terminal TC2. More specifically, this second request REQ2, which corresponds to a telephone call, is sent by communication module COM to communication module COM2 of second terminal TC2. Second request REQ2 is sent to second terminal TC2 via a second communication channel opened by platform PGC for this purpose.

During a step S35, platform PGC sends, in parallel with or subsequent to sending second request REQ2, a third request for telephone communication REQ3 to voicemail system MV associated with voicemail system caller identifier IAMV. Third request REQ3 includes main caller identifier IAP1 of first terminal TC1 and voicemail system caller identifier IAMV of voicemail system MV. The sending of third request REQ3 opens the third communication channel.

In the example illustrated in FIG. 1, the sending of third request REQ3 to voicemail system MV is implemented via voicemail system platform PMV. More specifically, reception of third request REQ3 is implemented via the application programming interface API. Platform PMV receives third request REQ3 and then extracts the information needed to determine the voicemail system for which third request REQ3 is intended. In the present case, platform PMV extracts voicemail system caller identifier IAMV and routes third request REQ3 to voicemail system MV associated with voicemail system caller identifier IAMV.

The sending of third request REQ3 means sending both an API call and a voice call, for example a call sent using the SIP protocol ("Signaling Internet Protocol"), each sent to voicemail system platform PMV via a specific channel. Voicemail system platform PMV is able to correlate the API call and the voice call and identify them as being components of the same request for telephone communication REQ3.

During a step S36, platform PGC is awaiting the reception of a favorable response from second terminal TC2 to second request REQ2. Of course, platform PGC is also awaiting a possible unfavorable response from second terminal TC2, indicating that the user of second terminal TC2 has refused the incoming call.

Typically, platform PGC waits for a predetermined period of time. If, at the end of this predetermined period of time, platform PGC has received neither a favorable response nor an unfavorable response to second request REQ2 from second terminal TC2, this lack of response is considered by platform PGC to be an unfavorable response.

Steps S37 and S38 detailed below are implemented in the event of platform PGC receiving a favorable response from second terminal TC2 to second request REQ2.

During step S37, platform PGC connects the first and second communication channels in order to establish a telephone communication between first terminal TC1 and second terminal TC2. Indeed, until this step of the process, the telephone call from first terminal TC1 has been placed on hold by platform PGC, and the telephone call from platform PGC to second terminal TC2 has also been on hold. The user of first terminal TC1 can then begin communication with the user of second terminal TC2.

During step S38, platform PGC closes the third communication channel.

Indeed, during step S35, the transmission of third request REQ3 had opened a third communication channel between platform PGC and voicemail system MV. However, since second terminal TC2 has issued a favorable response to second request REQ2 and the user of first terminal TC1 has been placed in contact with the user of second terminal TC2, communication with voicemail system MV is not needed after all.

Steps S39 and S310 detailed below are implemented in the absence of platform PGC receiving a favorable response from second terminal TC2 to second request REQ2. This non-reception of a favorable response means either the reception of an unfavorable response, or a complete lack of response during the predetermined period of time in which platform PGC awaits a response from second terminal TC2.

During step S39, platform PGC closes the second communication channel between platform PGC and second terminal TC2. Indeed, this second communication channel had been opened by the sending of second request REQ2 during step S34. Since communication is not possible between the user of first terminal TC1 and the user of second terminal TC2, it is not necessary to maintain the telephone call corresponding to second request REQ2.

In the event that a favorable response to second request REQ2 is not received from second terminal TC2, platform PGC sends third request REQ3 to voicemail system platform PMV. Thus, the voicemail system platform receives from platform PGC, via a data channel, a message or API request including voicemail system caller identifier IAMV associated with said secondary caller identifier and a request for telephone communication aiming to establish a communication between the first terminal and voicemail system MV with which voicemail system caller identifier IAMV is associated. The request for telephone communication is, for example, a request sent using the SIP protocol. According to some embodiments, this request for telephone communication includes the main caller identifier or the secondary caller identifier of the second terminal, making it possible to establish the correlation with the API message containing voicemail system caller identifier IAMV. The main or secondary caller identifier may be inserted into a header of the SIP request, for example in the "Diversion" field of the SIP request.

The API request contains voicemail system caller identifier IAMV and at least one among the caller identifier of the first terminal and the main and secondary identifiers of second terminal TC2.

According to various embodiments, voicemail system platform PMV makes the correlation between the sub-requests (API request and request for telephone communication such as a SIP request) in order to determine to which voicemail system the request for telephone communication is to be directed.

In one embodiment, the correlation is implemented by identifying, in the two sub-requests, the secondary caller identifier of second terminal TC2 or the main caller identifier of second terminal TC2. In another embodiment, the correlation between the sub-requests is implemented by identifying the caller identifier of first terminal TC1 (calling terminal).

During step S310, platform PGC connects the first and third communication channels in order to establish a communication between first terminal TC1 and voicemail system MV. The user of first terminal TC1 may then leave a voice message on voicemail system MV associated with secondary caller identifier IAS of second terminal TC2 and selected by platform PGC, and not on the voicemail system of main caller identifier IAP.

This first embodiment has the advantage that, if the user of second terminal TC2 refuses or ignores the telephone call corresponding to second request REQ2, the user of first terminal TC1 is quickly placed in telephone communication with voicemail system MV since the telephone call corresponding to third request REQ3 was sent in advance, at the same time as or subsequent to the sending of second request REQ2. The connection between the first communication channel and third communication channel in order to enable the user of first terminal TC1 to leave a voice message is then faster than in the case where this third request is sent to the voicemail system only in the absence of a favorable response from second terminal TC2 to second request REQ2.

The second embodiment of the method for establishing a telephone communication from first terminal TC1 to second terminal TC1 is described below with reference to FIG. 4.

During a step S41, platform PGC receives an incoming call, namely first request REQ1 from first terminal TC1. This step S41 is basically identical to step S31 of the first embodiment described above. In particular, here again, first request REQ1 may be routed to platform PGC via first network RES1, and more precisely via interactive voice response server SVI, such that platform PGC receives, in addition to first REQ1, input data characterizing a service requested by the user of first terminal TC1.

During a step S42, platform PGC searches, within database DB, for main caller identifier IAP2 associated at least with secondary caller identifier IAS. This step S42 is in fact identical to step S32 of the first embodiment.

During a step S43, platform PGC selects, within database DB, a voicemail system caller identifier associated at least with secondary caller identifier IAS of second terminal TC2. This step S43 is in fact identical to step S33 of the first embodiment. In particular, if several voicemail system caller identifiers are associated with secondary caller identifier IAS, then each voicemail system caller identifier can correspond to a service. Platform PGC can then select, among the voicemail system caller identifiers associated with secondary caller identifier IAS, the voicemail system caller identifier corresponding to the service requested by the user of first terminal TC1 and determined on the basis of the input data received by platform PGC.

During a step S44, platform PGC generates a second request for telephone communication REQ2. Second request REQ2 includes main caller identifier IAP1 of first terminal TC1 and main caller identifier IAP2 of second terminal TC2. Still during this step S44, platform PGC sends second request REQ2 to second terminal TC2. The sending of second request REQ2 opens a second communication channel. This step S44 is in fact identical to step S34 of the first embodiment.

During a step S45, platform PGC awaits the reception of a favorable response from second terminal TC2 to second request REQ2. Of course, platform PGC is also awaiting a possible unfavorable response from second terminal TC2, indicating that the user of second terminal TC2 has refused the incoming call. This step S45 is in fact identical to step S36 of the first embodiment.

Step S46 is implemented in the event that platform PGC receives a favorable response from second terminal TC2 to second request REQ2.

During step S46, platform PGC connects the first and second communication channels in order to establish a telephone communication between first terminal TC1 and second terminal TC2. Indeed, until this step of the process, the telephone call from first terminal TC1 has been placed on hold by platform PGC, and the telephone call from platform PGC to second terminal TC2 has also been on hold. The user of first terminal TC1 can then begin communication with the user of second terminal TC2. Step S46 is in fact identical to step S37 of the first embodiment.

Steps S47, S48, and S49 detailed below are implemented in the absence of platform PGC receiving a favorable response from second terminal TC2 to second request REQ2. This non-reception of a favorable response means either the reception of an unfavorable response, or a complete absence of response during the predetermined period of time in which platform PGC awaits a response from second terminal TC2.

During step S47, platform PGC closes the second communication channel between platform PGC and second terminal TC2. Indeed, this second communication channel had been opened by the sending of second request REQ2 during step S44. Since communication is not possible between the user of first terminal TC1 and the user of second terminal TC2, it is not necessary to maintain the telephone call corresponding to second request REQ2. This step S44 is in fact identical to step S39 of the first embodiment.

During step S48, platform PGC sends a third request for telephone communication REQ3 to voicemail system MV associated with voicemail system caller identifier IAMV. Third request REQ3 includes main caller identifier IAP1 of first terminal TC1 and voicemail system caller identifier IAMV of voicemail system MV. The sending of third request REQ3 opens the third communication channel. This step S48 is in fact similar to step S35 of the first embodiment, except that this step is not implemented in parallel with or subsequent to the sending of second request REQ2 to second terminal TC2. Indeed, in this second embodiment, the sending of third request REQ3 to voicemail system MV is implemented only if platform PGC does not receive a favorable response from the user of second terminal TC2 to the telephone call corresponding to second request REQ2. Third request REQ3 is for example implemented via the application programming interface API of platform PMV, which routes third request REQ3 to voicemail system MV by means of voicemail system caller identifier IAMV extracted from third request REQ3.

During step S49, platform PGC connects the first and third communication channels in order to establish a communication between first terminal TC1 and voicemail system MV. The user of first terminal TC1 may then leave a voice message on voicemail system MV associated with secondary caller identifier IAS of second terminal TC2 and selected by platform PGC, and not on the voicemail system of main caller identifier IAP. This step S49 is in fact identical to step S310 of the first embodiment.

This second embodiment has the advantage that the sending of third request REQ3 to voicemail system MV is only implemented if the user of second terminal TC2 refuses or ignores the telephone call corresponding to second request REQ2. This avoids the potentially unnecessary sending of third request REQ3 in the case where second terminal TC2 sends a favorable response to second request REQ2 sent by platform PGC.

The present development offers several advantages.

First of all, the development makes it possible to protect the personal information of a user of an alias service and to facilitate maintaining his or her anonymity. Indeed, the selection of a voicemail system associated with the alias number and the routing of the telephone call to this voicemail system by the communication management platform makes it possible to prevent a person who has dialed the alias number from accessing the voicemail system of the real number. Indeed, the voicemail system of the main caller identifier sometimes provides personal information about the user of the associated communication terminal.

Furthermore, the first embodiment and the sending in advance of the request for telephone communication to the voicemail system, in parallel with or subsequent to the sending of the request for telephone communication by the communication management platform to the called terminal, allows the user of the calling terminal to be connected quickly with the voicemail system of the alias number when the user of the called terminal does not answer the call.

The second embodiment prevents the sending of the request for telephone communication to the voicemail system associated with the alias number from being implemented unnecessarily. Indeed, this request is only sent if the user of the called terminal refuses or ignores the telephone call.

Finally, the use of an interactive voice response server in the context of the development makes it possible to improve the routing of a telephone call to a voicemail system associated with an alias number. Indeed, the input data obtained via the interactive voice response server allow determining a service requested by the user of the calling terminal and a more intelligent selection of a voicemail system that is not only associated with the alias number but is also dedicated to the service in question.

The invention claimed is:

1. A method of establishing a telephone communication from a first communication terminal to a second communication terminal, the first and second communication terminals each having a main caller identifier, the second communication terminal further having a secondary caller identifier, the method comprising:

receiving from the first terminal, at a communication management platform, a first request for telephone communication, comprising the secondary caller identifier of the second terminal;

sending to the second terminal, by the communication management platform, a second request for telephone communication, the second request comprising the main caller identifier of the second terminal;

the method further comprising:

in the event of the communication management platform not receiving, from the second terminal, a favorable response to the second request:

sending to a voicemail system platform, via a data channel, a voicemail system caller identifier associated with the secondary caller identifier; and sending to the voicemail system platform a request for telephone communication aiming to establish a communication between the first terminal and a voicemail system with which the voicemail system caller identifier is associated, the request for telephone communication comprising a first sub-request corresponding to a voice call and a second sub-request corresponding to an application programming interface call, the first and second sub-requests being correlated at the voicemail system platform or at the voicemail system.

2. The method according to claim 1, wherein the request for telephone communication aiming to establish a communication between the first terminal and the voicemail system comprises the secondary caller identifier and/or the main caller identifier of the second terminal, one among the identifiers being used to correlate the voicemail system caller identifier and the request for telephone communication aiming to establish a communication between the first terminal and the voicemail system.

3. The method according to claim 1, further comprising, in the event of the communication management platform not receiving, from the second terminal, a favorable response to the second request:

sending to the voicemail system, by the communication management platform, a third request for telephone communication, the third request comprising the voicemail system caller identifier of the voicemail system, the request for telephone communication aiming to establish a communication between the first terminal and the voicemail system.

4. The method according to claim 3, wherein the sending of the third request to the voicemail system is implemented via an application programming interface of a voicemail system platform, wherein the voicemail system platform extracts the voicemail system caller identifier comprised in the third request and routes the third request to the voicemail system.

5. The method according to claim 4, wherein the sending of the third request to the voicemail system includes sending a first sub-request containing the voicemail system caller identifier and a second sub-request corresponding to the request for telephone communication aiming to establish a communication between the first terminal and the voicemail system, the first sub-request corresponding to a voice call to record a voice message on the voicemail system, the second sub-request corresponding to a call to the application programming interface, the first and second sub-requests being correlated at the voicemail system platform or at the voicemail system.

6. The method according to claim 1, wherein the voicemail system caller identifier is selected in a database stored on or connected to the communication management platform.

7. The method according to claim 6, wherein the first request is routed to the communication management platform via an interactive voice response server, the communication management platform thus receiving, in addition to the first request, input data characterizing a service requested by a user of the first terminal, wherein the obtained voicemail system caller identifier is selected on the basis of the service, the secondary caller identifier, the requested service, and the voicemail system caller identifier being associated within the database.

8. The method according to claim 7, wherein the input data are generated via one or more interactions by the user with a telephone dialer type of application on the first terminal and/or via spoken information provided by the user of the first terminal.

9. The method according to claim 6, wherein the obtained voicemail system caller identifier is selected on the basis of the main caller identifier of the first terminal, the secondary caller identifier, the main identifier of the first terminal, and the voicemail system caller identifier being associated within the database.

10. A processing circuit comprising a processor and a memory, the memory storing program code instructions of a computer program for implementing the method according to claim 1, when the computer program is executed by the processor.

11. The method according to claim 1, wherein the first request is routed to the communication management platform via an interactive voice response server, the communication management platform thus receiving, in addition to the first request, input data characterizing a service requested by a user of the first terminal, and wherein the obtained voicemail system caller identifier is selected on the basis of the service.

12. The method according to claim 1, comprising:

sending to the voicemail system, by the communication management platform, in parallel with the sending of the second request to the second terminal, a third request for telephone communication, the third request comprising the voicemail system caller identifier, and in the event of receiving a favorable response to the second request: closing the communication channel opened by the third request.

13. The method according to claim 1, wherein the obtained voicemail system caller identifier is selected on the basis of the main caller identifier of the first terminal, and wherein the secondary caller identifier, the main identifier of the first terminal, and the voicemail system caller identifier are associated within a database.

14. A communication management platform for establishing a communication from a first communication terminal to a second communication terminal, the first and second communication terminals having each a main caller identifier, the second communication terminal further being associated with a secondary caller identifier, the communication management platform comprising:

a communication module arranged to receive, from the first terminal, a first request for telephone communication comprising the secondary caller identifier of the second terminal;

the communication module further being arranged to send a second request for telephone communication to the second terminal, the second request comprising the main caller identifier of the second terminal;

the communication management platform further comprising a processor arranged for:

in the event of a favorable response to the second request not being received from the second terminal:

sending to a voicemail system platform, via a data channel, a voicemail system caller identifier associated with the secondary caller identifier; and sending to the voicemail system platform a request for telephone communication aiming to establish a communication between the first terminal and a voicemail system with which the voicemail system caller identifier is associated, the request for telephone communication comprising a first sub-request corresponding to a voice call and a second sub-request corresponding to an application programming interface call, the first and second sub-requests being correlated at the voicemail system platform or at the voicemail system.

* * * * *